(12) United States Patent
Kim (10) Patent No.: US 12,537,248 B2
(45) Date of Patent: Jan. 27, 2026

(54) BATTERY MODULE HAVING FIRE TRANSITION PREVENTION STRUCTURE AND BATTERY PACK INCLUDING THE SAME

(71) Applicant: LG ENERGY SOLUTION, LTD., Seoul (KR)

(72) Inventor: In Jung Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 609 days.

(21) Appl. No.: 17/920,339

(22) PCT Filed: Jan. 11, 2022

(86) PCT No.: PCT/KR2022/000490
§ 371 (c)(1),
(2) Date: Oct. 20, 2022

(87) PCT Pub. No.: WO2022/158782
PCT Pub. Date: Jul. 28, 2022

(65) Prior Publication Data
US 2023/0170557 A1    Jun. 1, 2023

(30) Foreign Application Priority Data
Jan. 22, 2021    (KR) .......... 10-2021-0009216

(51) Int. Cl.
*H01M 50/143*    (2021.01)
*H01M 50/24*    (2021.01)
(52) U.S. Cl.
CPC ......... *H01M 50/143* (2021.01); *H01M 50/24* (2021.01)

(58) Field of Classification Search
CPC .. H01M 50/143; H01M 50/24; H01M 50/291; H01M 50/293; H01M 2220/20;
(Continued)

(56) References Cited

U.S. PATENT DOCUMENTS

2019/0097192 A1    3/2019    Kim et al.
2020/0028201 A1*   1/2020    Ahn ............... H01M 50/262
(Continued)

FOREIGN PATENT DOCUMENTS

| CN | 208781983 U | 4/2019 |
| CN | 110495013 A | 11/2019 |

(Continued)

OTHER PUBLICATIONS

Extended European Search Report for European Application No. 22742758.0, dated Sep. 11, 2024.
(Continued)

*Primary Examiner* — Daniel S Gatewood
(74) *Attorney, Agent, or Firm* — Birch, Stewart, Kolasch & Birch, LLP (57) ABSTRACT

A battery module has a fire transition prevention structure and a battery pack includes the battery module. The battery module has a fire transition prevention structure, the battery module including a module case, two or more unit modules received in an inner space of the module case in a state of being spaced apart from each other by a predetermined distance, and a blocking member located between the unit modules, the length of the blocking member being changed when the blocking member is heated to a predetermined temperature or higher.

13 Claims, 6 Drawing Sheets

(58) Field of Classification Search
CPC ............. H01M 50/204; H01M 50/242; H01M 2200/10; A62C 3/16; A62C 2/065; Y02E 60/10
See application file for complete search history.

(56) References Cited

U.S. PATENT DOCUMENTS

| | | | |
|---|---|---|---|
| 2021/0020877 A1* | 1/2021 | Chen | H01M 50/289 |
| 2021/0320374 A1 | 10/2021 | Lee et al. | |
| 2021/0359372 A1 | 11/2021 | Wu et al. | |
| 2022/0029222 A1 | 1/2022 | Lee | |
| 2022/0037714 A1 | 2/2022 | Lee | |
| 2022/0115737 A1 | 4/2022 | Shin et al. | |
| 2024/0039073 A1 | 2/2024 | Lee | |
| 2024/0186608 A1 | 6/2024 | Lee | |
| 2024/0186609 A1 | 6/2024 | Lee | |
| 2024/0186610 A1 | 6/2024 | Lee | |

FOREIGN PATENT DOCUMENTS

| | | | |
|---|---|---|---|
| CN | 210110876 U | 2/2020 | |
| CN | 110875443 A | 3/2020 | |
| CN | 111293251 A | 6/2020 | |
| CN | 211088320 U | 7/2020 | |
| JP | 2009-176455 A | 8/2009 | |
| KR | 10-0627395 B1 | 9/2006 | |
| KR | 10-2018-0114475 A | 10/2018 | |
| KR | 10-2019-0041727 A | 4/2019 | |
| KR | 10-2033101 B1 | 10/2019 | |
| KR | 10-2020-0105315 A | 9/2020 | |
| KR | 10-2020-0107213 A | 9/2020 | |
| KR | 10-2020-0110081 A | 9/2020 | |
| KR | 10-2021-0004189 A | 1/2021 | |
| WO | WO-2018062172 A1 * | 4/2018 | ............... C08K 3/00 |
| WO | WO 2020/180114 A1 | 9/2020 | |

OTHER PUBLICATIONS

International Search Report for PCT/KR2022/000490 (PCT/ISA/210) mailed on Apr. 19, 2022.

* cited by examiner

【FIG. 1】

Conventional Art

BATTERY MODULE HAVING FIRE TRANSITION PREVENTION STRUCTURE AND BATTERY PACK INCLUDING THE SAME

TECHNICAL FIELD

This application claims the benefit of priority to Korean Patent Application No. 2021-0009216 filed on Jan. 22, 2021, the disclosure of which is incorporated herein by reference in its entirety.

The present invention relates to a battery module having a fire transition prevention structure and a battery pack including the same, and more particularly to a battery module having a fire transition prevention structure, wherein a blocking member having a variable length is provided between battery modules, whereby it is possible to, when an event, such as fire, occurs in a specific battery module, prevent transition of fire or hot air to a unit module adjacent thereto, and a battery pack including the same.

BACKGROUND ART

With recent development of alternative energies due to air pollution and energy depletion caused as the result of use of fossil fuels, demand for secondary batteries capable of storing electrical energy that is produced has increased. The secondary batteries, which are capable of being charged and discharged, are intimately used in daily life. For example, the secondary batteries are used in mobile devices, electric vehicles, and hybrid electric vehicles.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

Meanwhile, when the secondary battery is used in a device that requires large capacity and high output, such as an electric vehicle, the secondary battery is used in the form of a battery module or a battery pack in which a plurality of battery cells is arranged.

However, when heat is generated while the secondary battery produces electric power and a thermal runaway phenomenon occurs in a specific battery cell due to short circuit, thermal impact, insulation breakdown, etc., high-temperature gas and fire may occur in the battery cell, which causes deformation and breakdown of unit cells adjacent thereto or the battery module.

Figure 1:
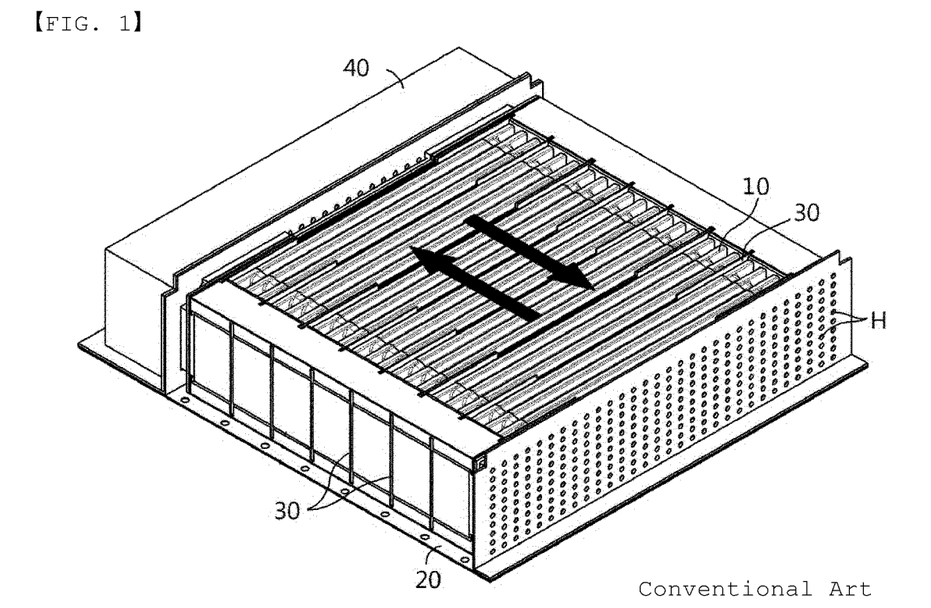
FIG. 1 is a perspective view showing a conventional battery module.

FIG. 1 is a perspective view showing a conventional battery module. As shown in FIG. 1, the conventional battery module includes a plurality of stacked battery cells 10, a case 20 configured to receive the plurality of battery cells 10, and a partition wall 30 disposed between a predetermined number of battery cells 10, the partition wall being provided in a predetermined region thereof with a flow path groove.

In the conventional battery module, a graphite sheet configured to expand when heat is applied thereto is provided in the flow path groove. When a predetermined level or more of heat is applied thereto, the graphite sheet expands to block the flow path, whereby adjacent battery cells 10 are isolated from each other.

In the conventional battery module, it is possible to prevent damage due to thermal runaway and fire from being transferred to a battery cell 10 adjacent thereto to some extent by the provision of the partition wall 30. Since the partition wall 30 is formed along all side surfaces of the battery cell 10 even at normal times, however, there is a disadvantage in that cooling efficiency is low.

Prior Art Document (Patent Document 1) Korean Patent Application Publication No. 2020-0107213

DISCLOSURE

Technical Problem

The present invention has been made in view of the above problems, and it is an object of the present invention to provide a battery module having a fire transition prevention structure configured such that circulation of air between an inside and an outside of the battery module is smoothly achieved at normal times, whereby sufficient cooling efficiency is achieved, and movement of fire or hot air to a unit module adjacent thereto is blocked when an event, such as fire or venting of gas, occurs, whereby secondary damage is prevented, and a battery pack including the same.

It is another object of the present invention to provide a battery module having a fire transition prevention structure configured such that no temperature sensor is provided and a blocking member having a simple structure capable of isolating adjacent unit modules from each other only when an event occurs is provided and a battery pack including the same.

Technical Solution

In order to accomplish the above objects, a battery module having a fire transition prevention structure according to the present invention includes a module case; at least two unit modules received in an inner space of the module case spaced apart from each other by a predetermined distance; at least one blocking member located between the at least two unit modules, the length of the at least one blocking member increasing when the at least one blocking member is heated to a predetermined temperature or higher.

Also, in the battery module according to the present invention, the module case may include an upper case, a side case, and a lower case, and a pair of guide protrusions spaced apart from each other by a predetermined distance so as to support the at least one blocking member may be provided on at least one of a lower surface of the upper case and an upper surface of the lower case.

Also, in the battery module according to the present invention, the at least one blocking member may include a pair of guide walls spaced apart from each other by a predetermined distance, each of the pair of guide walls having a flat structure, at least one blocking wall located in a space between the pair of guide walls, an expansion member located in the vicinity of the at least one blocking wall, and a pair of auxiliary walls configured to connect ends of the pair of guide walls to each other, and at least one of the pair of auxiliary walls may be made of a material that is melted or deformed when heated to a predetermined temperature or higher such that the blocking wall protrudes outside the guide walls due to the expansion member.

Also, in the battery module according to the present invention, the at least one blocking wall may be a pair of blocking walls with the expansion member between the pair of blocking walls.

Also, in the battery module according to the present invention, each of the pair of auxiliary walls may be made of a material that is melted or deformed when heated to a predetermined temperature or higher.

Also, in the battery module according to the present invention, the at least one blocking member may be two blocking members spaced apart from each other by a predetermined distance along side surfaces of the at least two unit modules.

Also, in the battery module according to the present invention, the expansion member may be a coil spring.

Also, in the battery module according to the present invention, the at least one blocking member may include a pair of guide walls spaced apart from each other by a predetermined distance, each of the pair of guide walls having a flat structure, a pair of blocking walls located in a space between the pair of guide walls, the pair of blocking walls being spaced apart from each other by a predetermined distance, and an expansion member located between the pair of blocking walls, the expansion member being configured to protrude the pair of blocking walls outside the guide walls when heated to a predetermined temperature or higher.

Also, in the battery module according to the present invention, the at least one blocking member may be two blocking members spaced apart from each other by a predetermined distance along side surfaces of the at least two unit modules, and an auxiliary wall may be provided at an end of the pair of guide walls of each of the two blocking members, the auxiliary walls located so as to face each other.

Also, in the battery module according to the present invention, the pair of guide walls the pair of blocking walls and the auxiliary walls may each be made of a heat-resistant material, and the expansion member may be made of a shape memory alloy configured to be changed in shape when heated to a predetermined temperature.

Also, in the battery module according to the present invention, the expansion member may have a coil shape.

In addition, the present invention provides a battery pack including the battery module.

Advantageous Effects

As is apparent from the above description, a battery module having a fire transition prevention structure and a battery pack including the same have an advantage in that a blocking member capable of preventing movement of fire or hot air to a battery module adjacent thereto only when heated to a predetermined temperature is provided, whereby it is possible to prevent secondary damage while maintaining cooling performance of the battery module or the battery pack.

In addition, the battery module having the fire transition prevention structure and the battery pack including the same have an advantage in that the blocking member includes no separate sensor configured to sense fire or venting of gas, and therefore the structure of the blocking member is simple while reliability in operation thereof is high.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module having a fire transition prevention structure according to the present invention and a battery pack including the same will be described with reference to the accompanying drawings.

Figure 2:
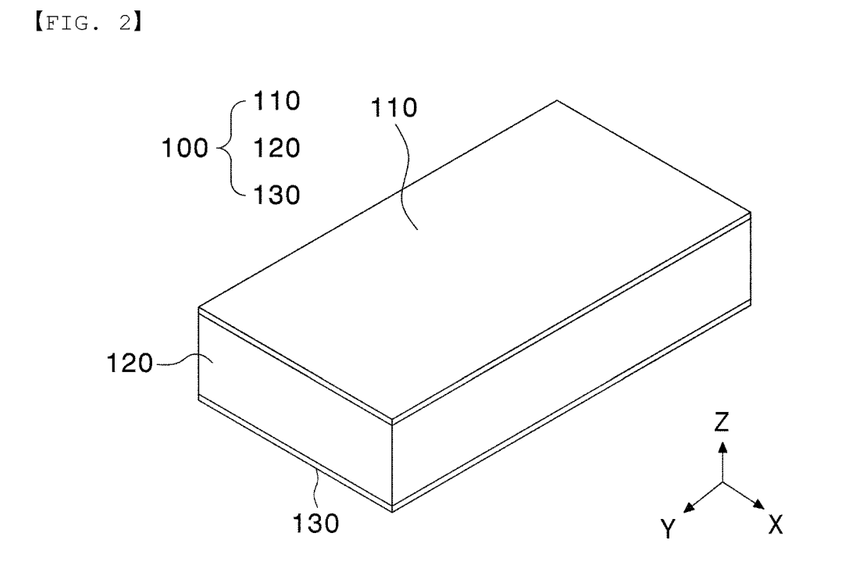
FIG. 2 is a perspective view of a battery module according to a first preferred embodiment of the present invention.
Figure 3:
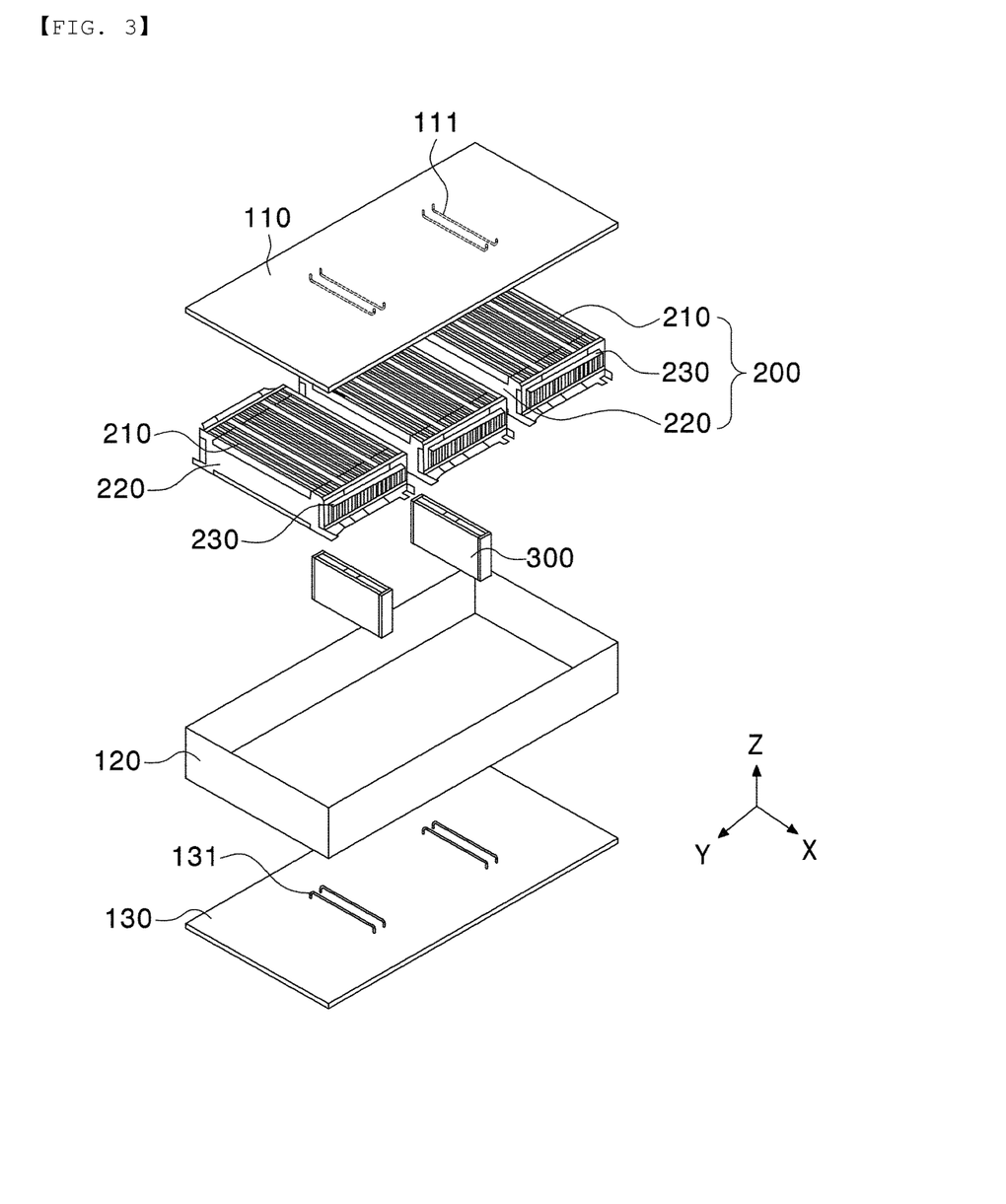
FIG. 3 is an exploded perspective view of the battery module according to the first preferred embodiment of the present invention.
Figure 4:
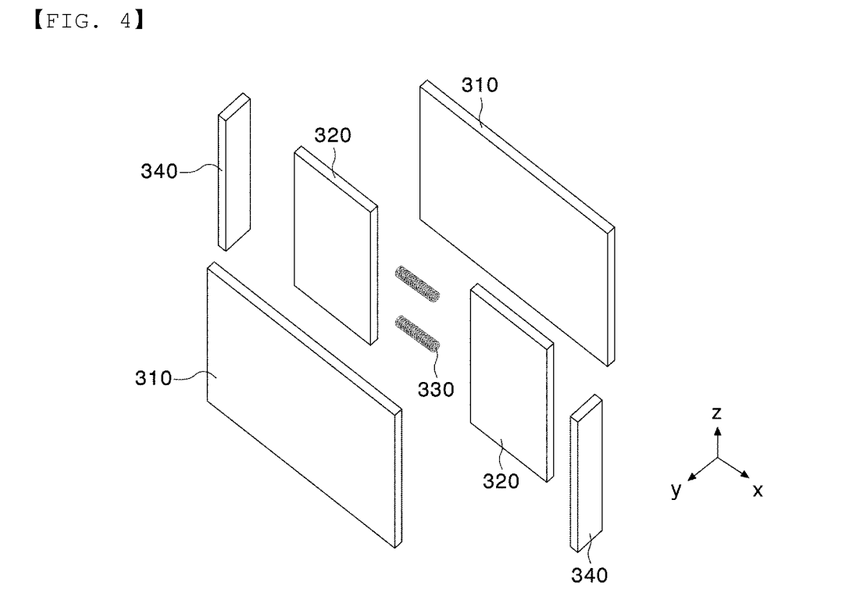
FIG. 4 is an exploded perspective view of a blocking member according to a first preferred embodiment of the present invention.

FIG. 2 is a perspective view of a battery module according to a first preferred embodiment of the present invention, FIG. 3 is an exploded perspective view of the battery module according to the first preferred embodiment of the present invention, and FIG. 4 is an exploded perspective view of a blocking member according to a first preferred embodiment of the present invention.

Referring to FIGS. 2 to 4, the battery module according to the first preferred embodiment of the present invention includes a module case 100, two or more unit modules (cell module assemblies) 200 received in the module case 100, and a blocking member 300 located between the unit modules 200.

First, when describing the module case 100 in detail, the module case 100, which is configured to wrap the plurality of unit modules 200, includes an upper case 110, a side case 120, and a lower case 130.

The upper case 110, which has a flat shape, is located above the unit modules 200 and the blocking member 300 in order to protect the unit modules and the blocking member from external impact. It is preferable for a pair of upper guide protrusions 111 spaced apart from each other by a predetermined distance to be formed on a lower surface of the upper case 110 such that the blocking member 300 is maintained in an upright state. Of course, the upper guide protrusions 111 may be omitted as long as the blocking member 300 can be supported in tight contact with the unit modules 200.

The side case 120, which has an approximately flat structure, protects side surfaces of the unit modules 200 and the blocking member 300, and the lower case 130, which has a flat shape, protects lower surfaces of the unit modules 200 and the blocking member 300.

Here, the lower case 130 may be provided on an upper surface with the same structure as the upper guide protrusions 111, i.e. a pair of lower guide protrusions 131 spaced apart from each other by a predetermined distance. The lower guide protrusions perform a function of supporting a lower edge and an upper edge of the blocking member 300 together with the upper guide protrusions 111.

Each of the unit modules 200 includes a plurality of battery cells 210 stacked side by side in a vertical or horizontal direction, an end plate 220, and a busbar assembly 230.

Each of the battery cells 210 includes a cell assembly, a cell case configured to receive the cell assembly, and a pair of leads.

The cell assembly may be a jelly-roll type cell assembly, which is configured to have a structure in which a long sheet type positive electrode and a long sheet type negative electrode are wound in the state in which a separator is interposed therebetween; a stacked type cell assembly constituted by unit cells, the unit cells having a structure in which a rectangular positive electrode and a rectangular negative electrode are stacked in the state in which a separator is interposed therebetween; a stacked and folded type cell assembly, which is configured to have a structure in which unit cells are wound using a long separation film; or a laminated and stacked type cell assembly, which is configured to have a structure in which unit cells are stacked in the state in which a separator is interposed therebetween and are then attached to each other. However, the present invention is not limited thereto.

The cell assembly is received in the cell case, and the cell case is generally configured to have a laminate sheet structure including an inner layer, a metal layer, and an outer layer. The inner layer is disposed in direct contact with the cell assembly, and therefore the inner layer must exhibit high insulation properties and high resistance to an electrolytic solution. In addition, the inner layer must exhibit high sealability in order to hermetically seal the cell case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and impact resistance, and excellent chemical resistance, is the most preferably used.

The metal layer, which is disposed so as to abut the inner layer, corresponds to a barrier layer configured to prevent moisture or various kinds of gas from permeating into the battery from the outside. An aluminum thin film, which is lightweight and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the cell assembly. As an example, the outer layer may be made of nylon or polyethylene terephthalate. However, the present invention is not limited thereto.

Meanwhile, the leads, which include a positive electrode lead and a negative electrode lead, are electrically connected to a positive electrode tab and a negative electrode tab of the cell assembly and are exposed outwards from the case. The battery cell corresponds to generally known constructions, and therefore a more detailed description thereof will be omitted.

A pair of end plates 220 is located at opposite sides of the plurality of battery cells 210 in order to fix the battery cells 210, and an upper and/or lower plate configured to connect the pair of end plates 220 to each other may be further provided as needed.

The busbar assembly 230 connects positive electrode leads and negative electrode leads protruding and extending from the plurality of stacked battery cells 210 to each other in series or in parallel. For bidirectional battery cells 210, the busbar assembly is provided at each of a front surface and a rear surface (X-axis direction) of the unit module 200. For unidirectional battery cells 210, the busbar assembly is provided at only one of the front surface and the rear surface of the unit module.

In the present invention, a unit module 200 having bidirectional battery cells 210 received therein will be described by way of example.

Next, the blocking member 300 will be described. At normal times, the blocking member 300 allows cooling air to freely pass through the unit modules 200. When an event, such as fire or venting of gas, occurs, however, the blocking member performs a function of preventing fire or heat from propagating to a unit module 200 adjacent thereto.

Specifically, the blocking member 300 is located between two or more unit modules 200 received in the module case 100, and includes a pair of guide walls 310 spaced apart from each other by a predetermined distance, each of the guide walls having a flat structure, a blocking wall 320 located in a space between the pair of guide walls 310, an expansion member 330 located in the vicinity of the blocking wall 320, and a pair of auxiliary walls 340 configured to connect opposite ends of the pair of guide walls 310 to each other.

Here, each of the pair of guide walls 310 and the blocking wall 320 is made of a heat-resistant material, such as aluminum (Al) or stainless steel, such that the shape thereof is maintained even at high temperatures.

A pair of flat blocking walls 320 is spaced apart from each other by a predetermined distance so as to be movable toward a pair of busbar assemblies 230. The expansion member 330 is interposed between the blocking walls 320.

The external shape of the expansion member 330 is not particularly restricted as long as the expansion member is compressed at normal times and the length of the expansion member can be increased when external force is removed. As an example, the expansion member may be a coil spring.

Meanwhile, the material for the pair of auxiliary walls 340 is not particularly restricted as long as the auxiliary walls can be melted, deformed, or broken when heated by fire breaking out in a specific unit module 200 or discharge of venting gas. As an example, a polyethylene-based resin, a polypropylene-based resin, or a polystyrene-based resin may be used.

Figure 5:
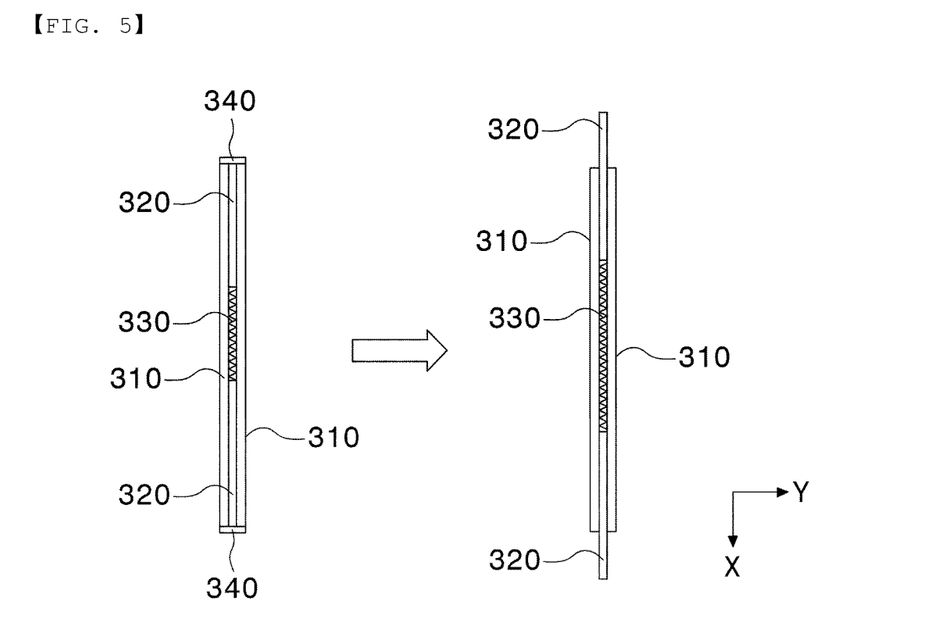
FIG. 5 is a plan view illustrating movement of a blocking wall of the blocking member according to the first preferred embodiment of the present invention when fire breaks out.

FIG. 5 is a plan view illustrating movement of the blocking wall of the blocking member according to the first preferred embodiment of the present invention when fire breaks out.

When describing the principle by which the blocking member having the above construction is operated, when the battery module is normally operated, the blocking member 300 is located between battery modules adjacent thereto, more specifically the length of the expansion member 330 is less than the length (X-axis direction) of the end plate 220 of the battery module, since the expansion member is in a compressed state, whereby cooling air is smoothly circulated.

When fire breaks out in a specific unit module 200 and temperature is increased, however, the auxiliary walls 340 are melted, deformed, or broken. At this time, the blocking walls 320 instantaneously protrude to rapidly block the unit modules 200 due to elastic force of the expansion member 330, thereby preventing transition of the fire.

Figure 6:
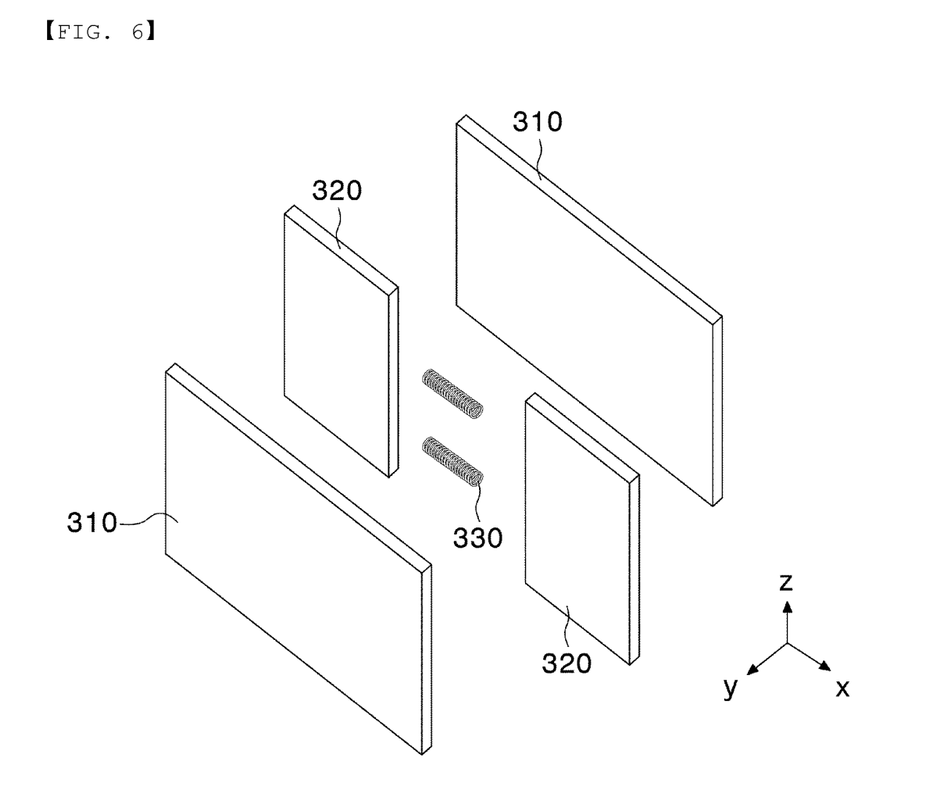
FIG. 6 is an exploded perspective view of a blocking member according to a second preferred embodiment of the present invention.

FIG. 6 is an exploded perspective view of a blocking member according to a second preferred embodiment of the present invention.

Referring to FIG. 6, the battery module according to the second preferred embodiment of the present invention is identical to the battery module according to the first preferred embodiment of the present invention described with reference to FIGS. 2 to 5 except for some constructions of the blocking member 300, and therefore a description of identical constructions will be omitted.

The blocking member 300 according to the second preferred embodiment of the present invention is located between two or more unit modules 200 received in the module case 100, and includes a pair of guide walls 310 spaced apart from each other by a predetermined distance, each of the guide walls having a flat structure, a pair of blocking walls 320 located in a space between the pair of guide walls 310, and an expansion member 330 located between the pair of blocking walls 320.

The expansion member 330 constituting the blocking member 300 according to the second preferred embodiment is made of a material that is changeable in shape so as to push the pair of blocking walls 320 outside the guide walls 310 when heated to a predetermined temperature or higher, e.g. a shape memory alloy, such as a titanium-nickel-based alloy, a copper-zinc-based alloy, or an alloy including at least one of vanadium, chromium, manganese, and cobalt. Preferably, the expansion member has a coil shape.

Figure 7:
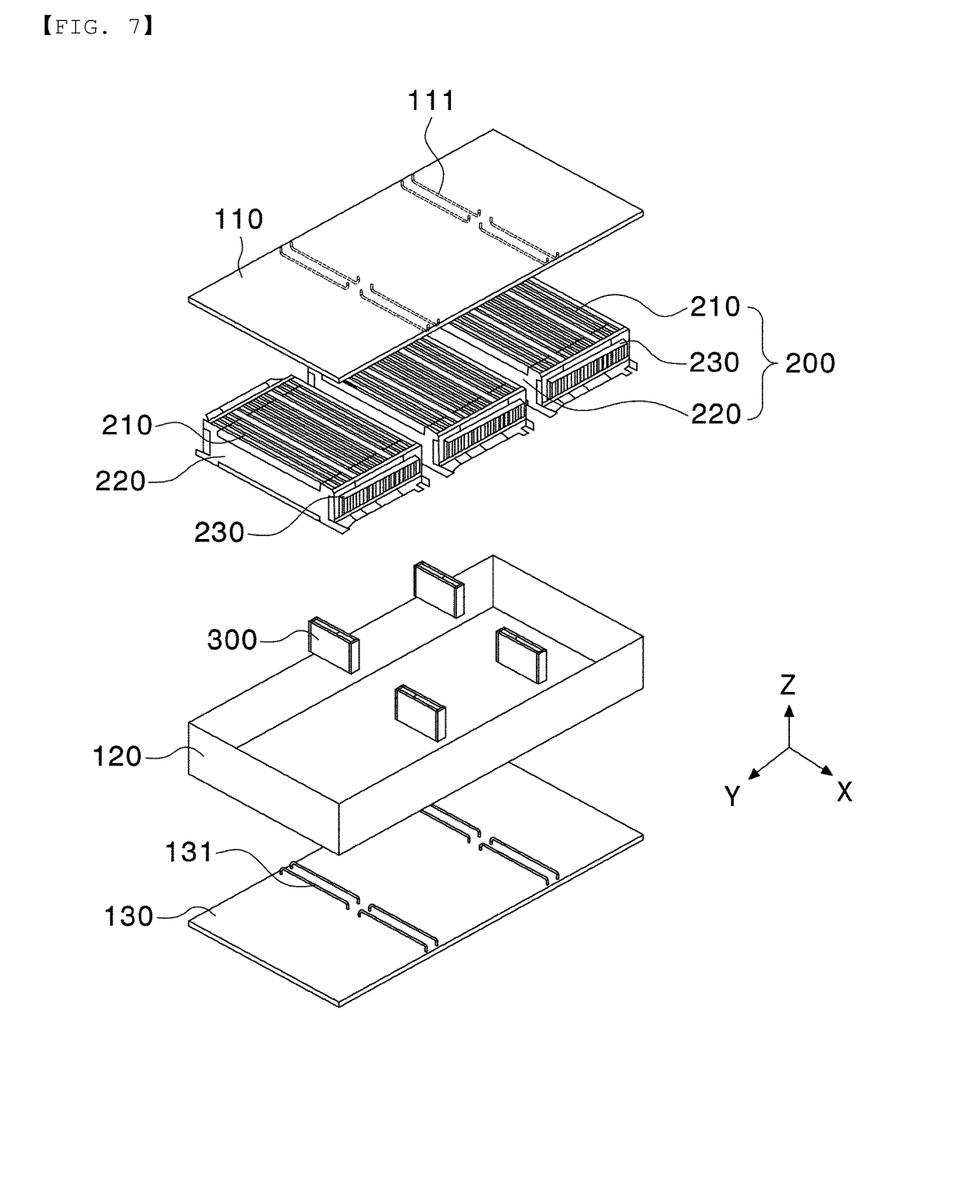
FIG. 7 is an exploded perspective view of a battery module according to a third preferred embodiment of the present invention.
Figure 8:
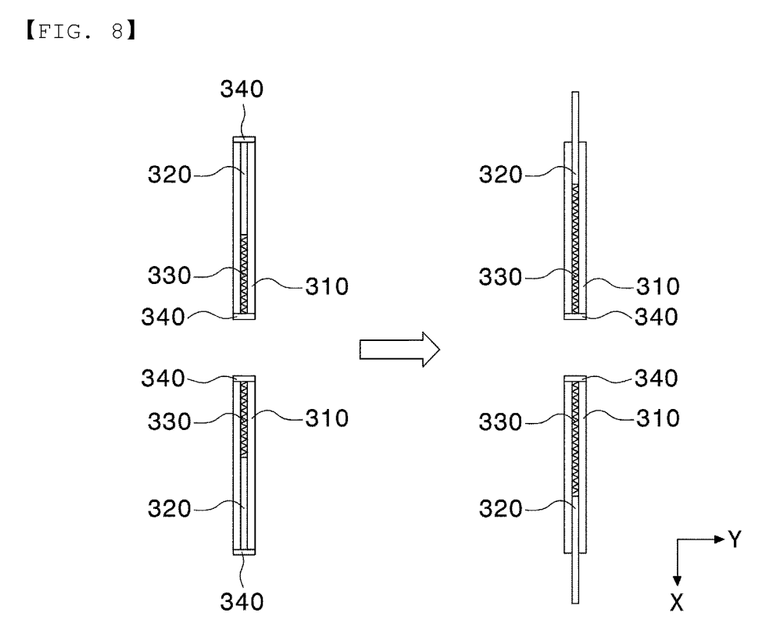
FIG. 8 is a plan view illustrating movement of a blocking wall of a blocking member according to a third preferred embodiment of the present invention when fire breaks out.

FIG. 7 is an exploded perspective view of a battery module according to a third preferred embodiment of the present invention, and FIG. 8 is a plan view illustrating movement of a blocking wall of a blocking member according to a third preferred embodiment of the present invention when fire breaks out.

Referring to FIGS. 7 and 8, the battery module according to the third preferred embodiment of the present invention is identical to the battery module according to the first embodiment described with reference to FIGS. 2 to 5 except for some constructions of the upper case 110, the lower case 130, and the blocking member 300, and therefore a description of identical constructions will be omitted.

The upper case 110 according to the third preferred embodiment of the present invention is provided on a lower surface thereof with a pair of upper guide protrusions 111 spaced apart from each other by a predetermined distance in a lateral direction (X-axis direction), and the lower case 130 is provided on an upper surface thereof with a pair of lower guide protrusions 131 spaced apart from each other by a predetermined distance.

Blocking members 300 are located two by two in a state of being spaced apart from each other by a predetermined distance along side surfaces (X-axis direction) of the unit modules 200.

Here, each of the blocking members 300 includes a pair of guide walls 310, a blocking wall 320, an expansion member 330 constituted by a coil spring, and auxiliary walls 340 configured to connect opposite ends of the guide walls 310 to each other. The auxiliary wall 340 in tight contact with the blocking wall 320 is made of a material that is melted, deformed, or broken when temperature is increased, and the auxiliary wall 340 in tight contact with the expansion member 330, the guide walls 310, and the blocking wall 320 are each made of a heat-resistant material.

When fire breaks out in a specific unit module 200 and temperature is increased, therefore, only the auxiliary wall 340 in tight contact with the blocking wall 320 is melted, deformed, or broken, whereby the blocking wall 320 protrudes in one direction, i.e. a direction toward the busbar assembly.

Figure 9:
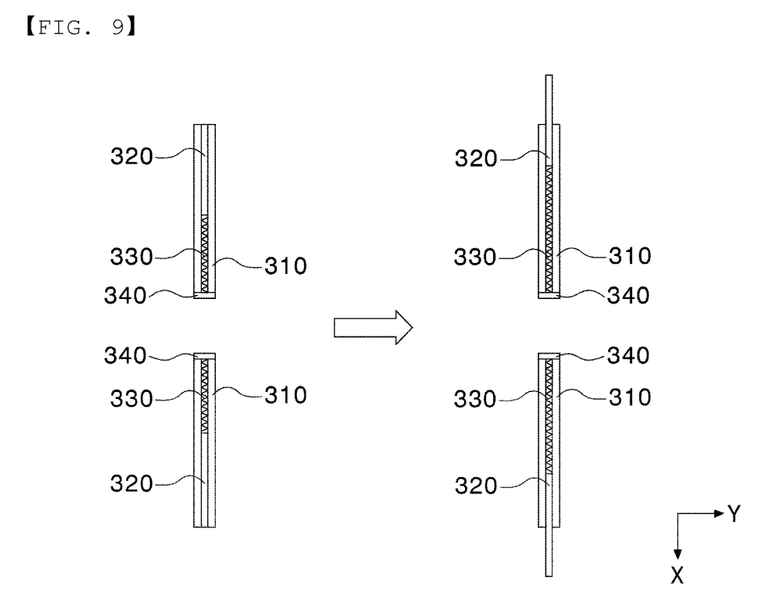
FIG. 9 is a plan view illustrating movement of a blocking wall of a blocking member according to a fourth preferred embodiment of the present invention when fire breaks out.

FIG. 9 is a plan view illustrating movement of a blocking wall of a blocking member according to a fourth preferred embodiment of the present invention when fire breaks out.

Referring to FIG. 9, the battery module according to the fourth preferred embodiment of the present invention is identical to the battery module according to the third embodiment described with reference to FIGS. 7 and 8 except for some constructions of the blocking member 300, and therefore a description of identical constructions will be omitted.

In the battery module according to the fourth preferred embodiment of the present invention, the blocking member 300 includes a pair of guide walls 310, an auxiliary wall 340 configured to connect one end of one of the guide walls 310 and one end of the other guide wall to each other, an expansion member 330 made of a shape memory alloy configured to be changed in shape when heated to a predetermined temperature or higher, and a blocking wall 320 in tight contact with the expansion member.

When fire breaks out in a specific unit module 200 and temperature is increased, therefore, the coil-shaped expansion member 330 expands. At this time, the blocking wall 320 protrudes in one direction, i.e. a direction in which there is no auxiliary wall 340, which is a direction toward the busbar assembly, whereby the unit modules 200 are isolated from each other.

Those skilled in the art to which the present invention pertains will appreciate that various applications and modifications are possible within the category of the present invention based on the above description.

DESCRIPTION OF REFERENCE NUMERALS

100: Module case
110: Upper case

111: Upper guide protrusion
120: Side case
130: Lower case
131: Lower guide protrusion
200: Unit module
210: Battery cell
220: End plate
230: Busbar assembly
300: Blocking member
310: Guide wall
320: Blocking wall
330: Expansion member
340: Auxiliary wall

The invention claimed is:

1. A battery module comprising:
a module case;
at least two unit modules received in an inner space of the module case spaced apart from each other by a predetermined distance; and
at least one blocking member located between the at least two unit modules, a length of the at least one blocking member increasing when the at least one blocking member is heated to a predetermined temperature or higher,
wherein the at least one blocking member comprises:
a pair of guide walls spaced apart from each other by a predetermined distance, each of the pair of guide walls having a flat structure;
at least one blocking wall located in a space between the pair of guide walls; and
an expansion member located in a vicinity of the at least one blocking wall.

2. The battery module according to claim 1, wherein the module case comprises an upper case, a side case, and a lower case, and
wherein a pair of guide protrusions spaced apart from each other by a predetermined distance so as to support the at least one blocking member is provided on at least one of a lower surface of the upper case and an upper surface of the lower case.

3. The battery module according to claim 1, wherein the at least one blocking member further comprises:
a pair of auxiliary walls configured to connect ends of the pair of guide walls to each other, and
wherein at least one of the pair of auxiliary walls is made of a material that is melted or deformed when heated to a predetermined temperature or higher such that the at least one blocking wall protrudes outside the guide walls due to the expansion member.

4. The battery module according to claim 3, wherein the at least one blocking wall is a pair of blocking walls with the expansion member between the pair of blocking walls.

5. The battery module according to claim 4, wherein each of the pair of auxiliary walls is made of a material that is melted or deformed when heated to a predetermined temperature or higher.

6. The battery module according to claim 3, wherein the at least one blocking member is two blocking members spaced apart from each other by a predetermined distance along side surfaces of the at least two unit modules.

7. The battery module according to claim 3, wherein the expansion member is a coil spring.

8. The battery module according to claim 1,
wherein the at least one blocking wall is a pair of blocking walls located in a space between the pair of guide walls, the pair of blocking walls being spaced apart from each other by a predetermined distance, and
wherein the expansion member is located between the pair of blocking walls, the expansion member being configured to protrude the pair of blocking walls outside the guide walls when heated to a predetermined temperature or higher.

9. The battery module according to claim 8, wherein the at least one blocking member is two blocking members spaced apart from each other by a predetermined distance along side surfaces of the at least two unit modules, and
wherein an auxiliary wall is provided at an end of the pair of guide walls of each of the two blocking members, the auxiliary walls located so as to face each other.

10. The battery module according to claim 9, wherein the pair of guide walls, the pair of blocking walls, and the auxiliary walls are each made of a heat-resistant material, and
wherein the expansion member is made of a shape memory alloy configured to be changed in shape when heated to a predetermined temperature.

11. The battery module according to claim 10, wherein the expansion member has a coil shape.

12. A battery pack comprising the battery module according to claim 1.

13. The battery module according to claim 1, wherein the at least one blocking wall is a pair of blocking walls located in a space between the pair of guide walls, the pair of blocking walls being spaced apart from each other by a predetermined distance.

* * * * *